United States Patent Office 2,903,114
Patented Sept. 8, 1959

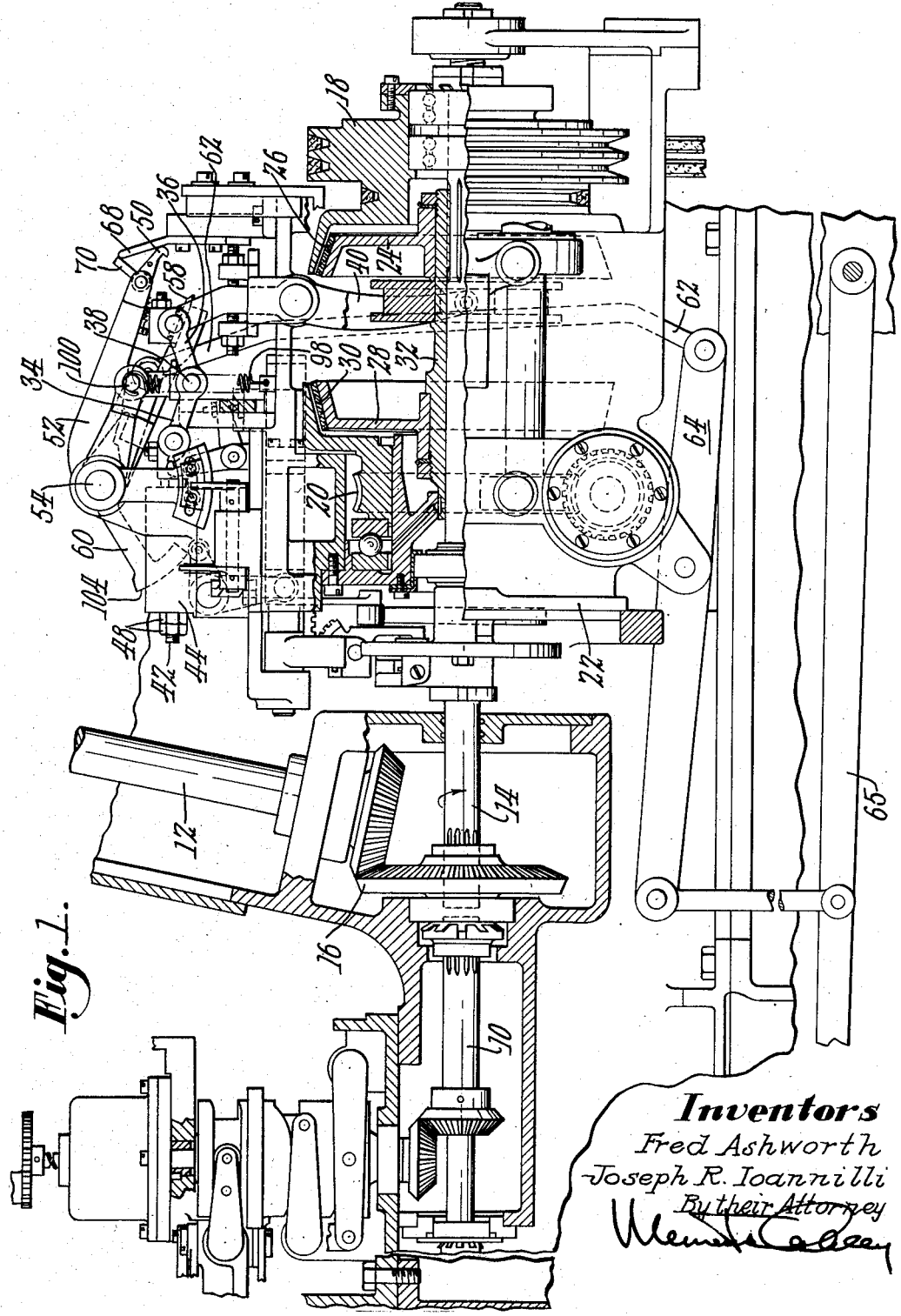

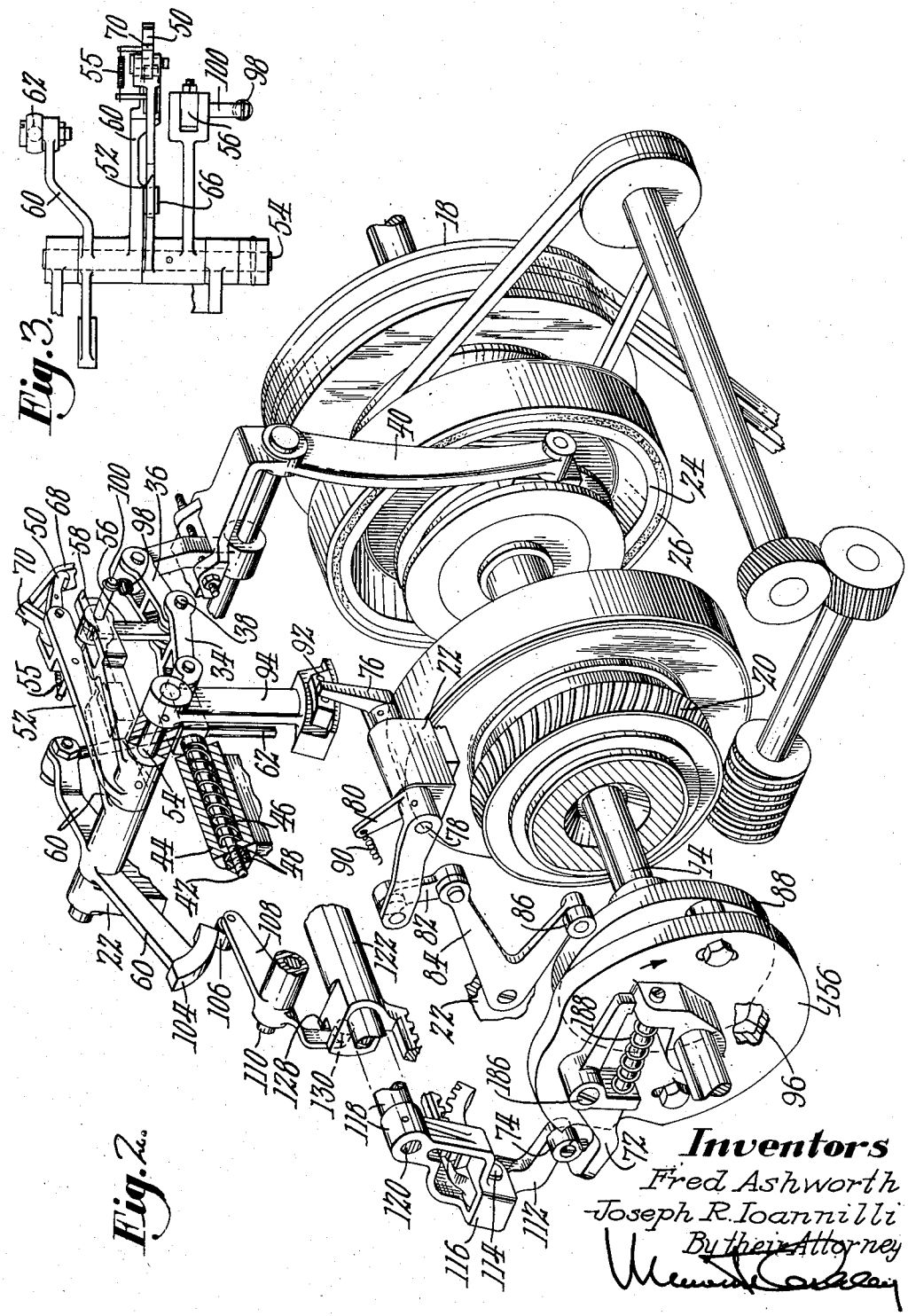

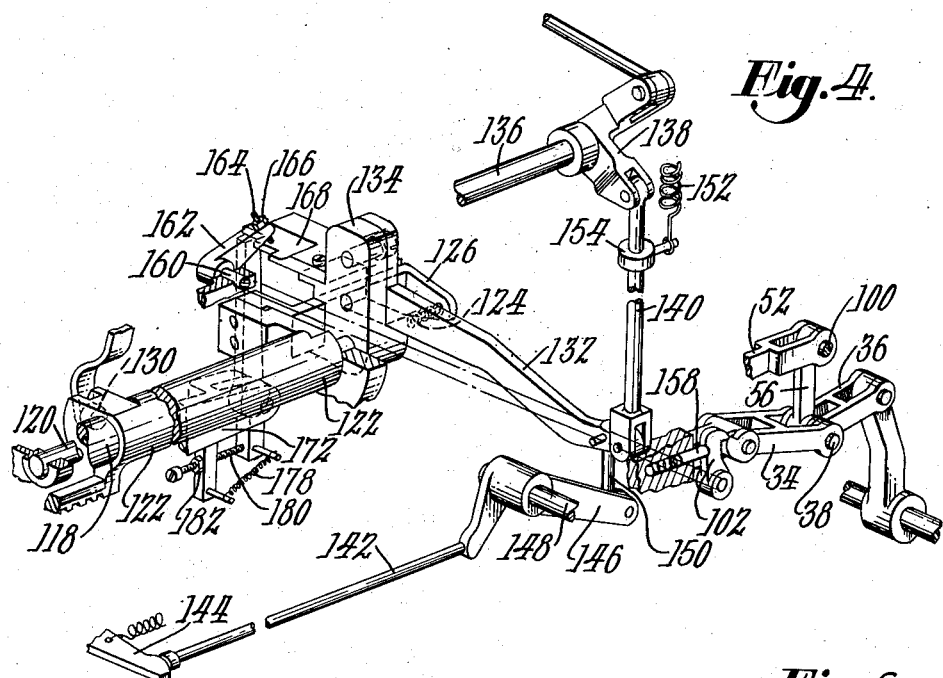

2,903,114

DRIVING AND STOPPING MECHANISMS

Fred Ashworth, Wenham, and Joseph R. Ioannilli, Beverly, Mass., assignors to United Shoe Machinery Corporation, Boston, Mass., a corporation of New Jersey Application May 7, 1957, Serial No. 657,668

7 Claims. (Cl. 192—146)

This invention relates to improvements in driving and stopping mechanisms which are particularly suitable for transmitting power to a heavily constructed shoe sewing machine, and for stopping such a machine at a predetermined point of its sewing cycle.

In some respects, the driving and stopping mechanism embodying the present invention is similar to a prior one disclosed in a co-pending application for United States Letters Patent No. 543,428, filed October 28, 1955, in the names of the present inventors. Both the prior and the present driving mechanisms include shafts, which may be driven either through high-speed clutches or through low-speed clutches selectively engageable in response to movements of control treadles. In each mechanism the low-speed clutch is engaged temporarily to provide braking action when it is desired to stop after operating at high speed. The prior mechanism includes a device for sensing the braking action of the low-speed clutch and for delaying initiation of the final stage of the machine stopping cycle until after the braking effect has reduced the speed of the driven shaft to that of the low-speed clutch. The duration of the stopping period of the prior mechanism is therefore variable in accordance with the momentum of the machine parts and the braking action of the low-speed clutch. In addition to variations in the duration of successive stopping periods, which may under certain circumstances assume objectionable proportions, the prior driving and stopping mechanism is also both complex and expensive to construct.

It is accordingly an object of the present invention to provide a more simple mechanism than has heretofore been available for driving and stopping heavily constructed sewing or other machines having similar driving and stopping requirements. It is another object to provide such a mechanism in which the need for sensing the braking action of a low-speed clutch during a stopping cycle is completely eliminated. Yet another object is to provide a driving and stopping mechanism in which a braking force is applied to the driven shaft during a fixed angle of rotation for stopping the mechanism in a predetermined angular position of the driven shaft and with minimum danger of damage due to excessive shock. It is still another object to provide an improved driving and stopping mechanism of the type referred to which may be adjusted for variations in machine driving and stopping requirements and for compensation of wear in the control connections. Another object is to provide a machine driving and stopping mechanism, which, although relatively economical to manufacture, is more reliable and accurate in operation than mechanisms heretofore available.

In the achievement of the foregoing objects, an important feature of the invention relates primarily to a nonyielding disconnectible connection interposed in a driving and stopping mechanism between the control treadle and a toggle, the movement of which toggle regulates the engagement and disengagement of the high- and low-speed clutches. As in the prior mechanisms, the toggle is connected to a driven member of each of the two clutches in such a way that the low-speed clutch is engaged when the links of the toggle are substantially alined. The high-speed clutch is engaged when the links are substantially misalined, and both clutches are disengaged when the links are arranged in either of two positions in which they are neither substantially alined nor substantially misalined. The novel disconnectible connection between the treadle and the central joint of the toggle in the present mechanism comprises a latch, which when engaged causes the position of the toggle to vary exactly in accordance with that of the control treadle and when released allows the control treadle to be moved without imparting a corresponding motion to the toggle. The independent motion of the treadle is utilized in stopping the mechanism for performing certain necessary auxiliary functions by means of elements connected to the treadle without at the same time causing motion of the toggle.

Since the speed at which a shoe sewing machine is operated must be accurately regulated according to positioning movements imparted to a shoe being presented to the machine, the latch of the invention offers a valuable advantage in driving and stopping mechanisms intended for use in combination with shoe sewing machines. In sewing about the contour of a shoe the straighter portions of the seam may be inserted at high speed but in those parts of the shoe having more abrupt curvatures the sewing speed must be substantially reduced for accurate insertion of the seam. An accepted method of regulating the speed of a sewing machine is by causing variable relative slippage between the driving and driven members of a clutch by changing the pressure of engagement between the members. Because the latch of the present mechanism provides a positive connection for movement in two directions between the treadle and the toggle, a more quickly responsive control is possible than in the prior driving and stopping mechanism in which the connections between the treadle and toggle include two arms one overlying the other. The arrangement of the prior mechanism provides positive control of the high-speed clutch when the treadle is depressed for increasing the contact pressure between the driving and driven member of the high-speed clutch but relies upon a spring for reduction of the contact pressure in response to releasing of the treadle by the machine operator's foot. By reason of the spring force the overlying arms in the prior mechanism may separate momentarily as the treadle is released to reduce the contact pressure so that the speed is reduced only after an objectionable delay. The operator's sense of reaction from treadle movement is also absorbed by the spring, thus increasing the difficulty of intelligently controlling the machine. Because a momentary lag is possible between treadle movement and consequent change in clutch member contact pressure and because a yielding connection does not provide an operator with a fully satisfactory reaction to foot pressure, the nonyielding connection acting positively in two directions in the present mechanism is superior to the prior one-way connection, especially for use in conjunction with heavily constructed sewing machines requiring positive stopping in a predetermined position.

Another feature of the invention relates to a timing or lockout, the operation of which ensures engagement of the low-speed clutch through a fixed angle of rotation of the driven shaft before the latter is stopped in a predetermined position. To avoid undue shock in stopping, the angle through which the driven shaft rotates at low speed is chosen to assure sufficient braking action before engagement of a pair of shaft stopping impact members. Another result of the timing lockout is that the speed of the driven shaft is reduced gradually, first by a variable free coasting period before the low-speed clutch is engaged upon the actuation of the timing lockout and then by the braking action of the low-speed clutch. As a result of the consequently decreased momentum during the variable free coasting period the clutch members have a longer useful life than would otherwise be possible and a smoother stopping action is obtained. Still other features relate to the use of an auxiliary operations arm actuated during the stopping cycle for performing certain functions, such as raising the presser foot of a sewing machine with which the driving and stopping mechanism may be employed and a detent for maintaining the low-speed clutch in engagement until the auxiliary operations arm is actuated in stopping.

The foregoing objects will be more full appreciated and the various features of the invention will be more fully understood from the following detailed description of an illustrative embodiment, taken in connection with the accompanying drawings in which:

Fig. 1 is a sectional view from the right side of a portion of a sewing machine equipped with a driving and stopping mechanism embodying the features of the present invention;

Fig. 2 is a perspective view looking from the right front of the driving and stopping mechanism shown in Fig. 1 with some of the parts omitted for clarity;

Fig. 3 is a detail plan view of clutch control connections incorporated in the driving and stopping mechanism;

Fig. 4 is a view in perspective showing an auxiliary operations arm and its actuating means;

Fig. 5 is a view in right side elevation and partly in cross section of the auxiliary arm actuating means shown in Fig. 4;

Fig. 6 is a fragmentary plan view showing connections to the rearward end of a shaft on which the auxiliary arm is mounted;

Fig. 7 is a view in left side elevation showing a latch for holding the auxiliary arm of Fig. 4 stationary at one end of its travel; and Fig. 8 is a schematic perspective view showing the manner in which the latch of Fig. 7 is released.

The apparatus embodying the present invention is shown in Figures 1 and 2 as a readily removable driving and stopping mechanism, especially suitable for heavy sewing machines and other machines having similar driving and stopping requirements. Like the prior mechanism of the above-identified co-pending application, the present mechanism, by being readily removable, provides greater facility for repairs, adjustments, and replacements. The mechanism is shown in the drawings connected to a shoe sewing machine of the McKay type, which is operated through a horizontal shaft 10 and an oblique shaft 12 by means of a horizontal shaft 14 driven by the driving and stopping mechanism. The driven shaft 14 is splined at its forward end for coupling to a gear 16, which in turn drives the shafts 10 and 12. Since the sewing machine comprising the shafts 10 and 12 forms no part of the present invention, it will not be described further in the present application but it may be fully understood if need be by reference to the co-pending application.

The present mechanism like the prior mechanisms includes high- and low-speed clutches having driving members 18 and 20, respectively, surrounding the driven shaft 14. The driven shaft 14 is rotatably supported in a housing or frame 22 very similar to that of the prior mechanism. Since the arrangement of the clutch driving members and of the driven shaft 14 is exactly like that of the prior mechanism, it will not be described in detail but reference may be made to the co-pending application for a fuller understanding.

Because the need for a speed sensing device has been eliminated, as will be explained, the driven members of the present clutches, although similar to those of the prior mechanism, have been considerably simplified in their mountings. Thus, the high-speed driven member comprises a wheel 24 having a peripheral facing 26, fixed together with a low-speed wheel 28, having a peripheral facing 30 both secured to a sleeve 32 splined to the driven shaft 14 in a manner permitting the sleeve to be moved axially on the latter. The action of the driven clutch members when engaged with their respective driving members is the same as in the prior mechanism, except that the low-speed driven member 28 is not free for limited rotary movement relative to the sleeve 32 but directly causes rotation of the latter and of the driven shaft as soon as the facing 30 engages the driving surface of the low-speed clutch member 20.

Engagement and disengagement of the clutches is controlled by the position of a toggle comprising links 34, 36 having a central joint in the form of a pivot 38. The toggle and its connections to the sleeve 32 are exactly the same as in the prior mechanism and include a yoke 40 pivotally coupled through interposed elements to the end of the link 36 remote from the pivot 38. The forward end of the link 34 is pivoted on a square-headed stud 42 (Fig. 2) slidable in a counterbored opening of a lug 44 integral with the frame. As in the prior mechanism the stud 42 is pressed rearwardly by a compression spring 46 and its rearward movement is limited by a pair of check nuts 48.

In accordance with one of the features of the present invention we have provided a disconnectible connection rather than a one-way actuating connection between the control treadle and the central joint of the toggle. The disconnectible connection includes a latch 50 pivoted at the rearward end of one of the arms of a two-armed lever 52 pinned to a horizontal shaft 54, which is rotatably supported in upstanding ears integral with the frame 22, the latch being shiftable in an arcuate path with the lever 52. The other arm of the lever 52 is pivoted at its rearward end to a generally vertical link 56, the lower end of which loosely surrounds the pin 38, which forms the central joint of the toggle. The latch 50 is urged by a spring 55 into engagement with a finger 58 fixed at the rearward end of one of the arms of a three-armed lever 60 rotatable on the shaft 54, the said arm of the three-armed lever 60 having a lateral projection 66 underlying the latch carrying arm of the lever 52. When the latch 50 is engaged with the finger 58 the levers 52 and 60 are coupled by the latch and the projection 66 for conjoint movement, and the relative positions of the toggle links are determined by the position of the lever 60, which is, in turn, connected to the control treadle. When the latch 50 is disengaged the lever 60 may be moved downwardly away from the lever 52. A second rearwardly extending arm of the lever 60 is connected by means of an irregularly shaped link 62 to a lever 64 (Fig. 1) fulcrumed on the frame 22 and coupled to a treadle 65 in much the same manner as that of the prior mechanism.

With the parts positioned as illustrated in Fig. 2, the latch 50 is held out of engagement with the finger 58 of the lever 60 by the engagement of a projection 70 integral with the latch, with a stationary stop member 68 adjustably fixed upon the frame 22. The projection 66 engages the under side of the lever 52 forming a one-way connection so that upon depression of the treadle and counterclockwise movement of the lever 60, the lever 52 is caused to move similarly because of the engagement of the projection 66 therewith, whereupon the projection 70 moves out of engagement with the stop member 68 and the latch is moved by the spring 55 into latching engagement with the finger 58. But in stopping the machine it will be obvious that after release of the latch 50 further raising of the treadle imparting a clockwise movement to the lever 60 will have no effect on the position of the lever 52, the one-way connection being effective only when the lever 60 carrying the projection 66, when in engagement with the lever 52, is moved in a counterclockwise direction as seen in Fig. 2. Thus, the levers 52 and 60 are connected for unitary movements in either direction by the projection 66 and by the engagement of the latch 50 with the finger 58, which forms a disconnectible connection.

While the latch is engaged the axial force bringing the clutch members into engagement is determined directly by the position of the control treadle, since the levers 52 and 60 then move together. When the treadle is released the projection 70 on the latch 50 contacts the stationary stop member 68 for disengaging the latch from the finger 58.

The mechanism is brought to a stop in a predetermined angular position of the driven shaft 14 by engagement of impact stop members including a buffer lever 72 mounted on the driven shaft and a stop roll 74 which acts as a stationary stop member. During the operation of the mechanism the roll 74 is maintained out of the path of the buffer lever as long as the latch 50 of the disconnectible connection remains engaged as will be hereinafter described.

In order to minimize shock accompanying the engagement of the impact stop members the low-speed clutch is engaged for a fixed period of time after the high-speed clutch is disengaged so that it will act as a brake upon the driven shaft before the impact stop members come into contact with each other. Before the period of low speed braking starts the driven shaft 14 may rotate freely without being driven by either clutch. The start of the braking period is controlled by a timing pawl which includes a pawl lever 76 pinned to one end of a shaft 78 rotatable in a lug integral with the frame 22. A two-armed lever 80 is pinned to the other end of the shaft 78 and is connected by a link 82 to one arm of a V-shaped lever 84 pivoted on the frame 22. The lever 84 carries at the extremity of its other arm a follower roll 86 maintained in engagement with a cam 88, fixed upon the shaft 14. The roll is pressed against the cam 88 by a tension spring 90 stretched between a free arm of the lever 80 and an anchor point on the frame.

To enable an operator to feel the reaction on his foot as it rests on the control treadle 65 before the braking period starts, the latch 50 is held temporarily in engagement with the finger 58, after the control treadle is partially released. This temporary holding is accomplished by engagement of the pawl lever 76 with the front face of an arcuate block 92 adjustably fixed upon the lower end of a depending arm 94 pinned to the shaft 54. The cam 88 is formed with a periphery concentric with the axis of the shaft 14 except for a projection 96, so that the pawl lever 76 remains motionless except when the projection engages the follower roll 86. When the treadle is released for stopping the machine, clockwise movement of the arm 94 is arrested by engagement of the forward face of the block 92 with the pawl lever 76 thus preventing the latch 50 from becoming disconnected and also delaying engagement of the low-speed clutch until the cam projection 96 causes the pawl lever 76 to move out of the path of the arcuate block. It is at this time that the driven shaft 14 rotates freely. The projection 96 is oriented on the shaft 14 to engage the follower roll 86 approximately 180° of shaft rotation before the impact stop members come into contact, as shown in Fig. 2. During the major portion of this 180° rotation of the low-speed clutch is effective to reduce the speed of the driven shaft 14. During the final portion of this 180° rotation the driven shaft rotates under the force of its own momentum so that the engagement of the stop members occurs with a minimum of shock. It will also be appreciated that if, for example, the control treadle is released when the buffer lever 72 is less than 180° from the position of the stop roll 74, the lever 76 engages the block 92 thereby keeping both clutches disengaged until the projection 96 causes the block 92 to be released. Thus, the shaft 14 revolves approximately 180° if the projection 96 is in contact with the follower roll at the time the treadle is released, but the stopping cycle including a variable coasting period may be extended by almost a complete revolution of the driven shaft if the projection has just moved out of contact with the follower roll at the time that the treadle is released.

When the block 92 is released by the lever 76, limited movement is imparted to the central joint of the control toggle by the force of a spring 98 (Figs. 1 and 3) stretched between the frame 22 and a pivot pin 100 which forms the connection between the link 56 and the lever 52. The movement of the central joint is arrested before the toggle assumes the position depicted in Figs. 1 and 2 by a lockout latch 102, shown in Fig. 4, which engages a suitable projection on the toggle link 34. The limited movement of the toggle links causes the low-speed clutch to engage. During this limited movement after the low-speed clutch has become engaged, the latch 50 is released by engagement of the projection 70 with the fixed stop member 68 and thereafter the lever 60 is moved to its clockwise extreme, as shown in Figs. 1 and 2, by a spring (not shown) connected to the control treadle as in the prior mechanism. Since the latch 50 is released after the low-speed clutch becomes engaged, the present arrangement enables an operator to feel, by means of treadle reaction, the time of engagement of either clutch. Such movement of the lever 60 after release of the latch 50 occurs without affecting the positions of the control toggle or the lever 52, since the levers 52 and 60 are then independent.

A cam segment 104 formed integrally with a forwardly extending arm of the lever 60 normally positions the stop roll 74 out of the path of the buffer lever 72 during operation of the mechanism and permits movement of the roll into the path of the lever for bringing the mechanism to a stop. For maintaining the stop roll 74 out of the path of the buffer lever the cam segment engages a follower roll 106 rotatable at the end of a rearwardly extending arm of a lever 108 pivoted on a stud 110 which is fixedly supported in the frame. The stop roll 74 is rotatably mounted on a depending arm of a lever 112, the upper end of which is formed into a gear segment. The lever 112 is fulcrumed on a transverse stud 114 in a pendant arm 116 integral with an inner sleeve 118 surrounding a shaft 120. The arm 116 is pinned to the shaft 120, which is rotatably mounted in a pair of opposed ears integral with the frame. The inner sleeve is surrounded by an outer sleeve 122 having its forward end formed with rack teeth which mesh with those of the gear segment on the lever 112. The outer sleeve 122 is axially slidable on the inner sleeve and when in its most forward position causes the stop roll 74 to assume the position shown in dot and dash lines in Fig. 5 in which position the roll lies out of the path of the buffer lever. A spring 124 compressed between the shaft 120 and an offset member 126 fixed to the rearward end of the outer sleeve biases the latter for rearward movement. The outer sleeve 122 is formed at its forward end with a lateral projection having a vertical slot 128, which is engaged by a roll 130 rotatably mounted on a depending arm of the lever 108. When the follower roll 106 is engaged by the cam segment 104, the outer sleeve 122 is thus maintained in its forward position against the bias of the compression spring 124 and the stop roll 74 is thus kept out of the path of the buffer lever 72. When the arm 60 is freed by the release of the latch 50 to turn in such a manner that the cam segment 104 moves out of engagement with the roll 106, the sleeve 122 is urged rearwardly by the spring 124 and the stop roll 74 is consequently thrust into the path of the buffer lever.

Before the driven shaft of the driving and stopping mechanism is stopped certain auxiliary motions may be necessary in the machine with which the mechanism is associated. Thus, in the sewing machine fragmentarily shown in Fig. 1 it is advantageous to raise the presser foot and to alter the timing of the thread locks before the machine is stopped. For this purpose, the driving and stopping mechanism includes an auxiliary arm 132 (shown in Fig. 4) securely bolted to a plate 134 fixedly mounted on the shaft 120 adjacent its rearward end. The sewing machine presser foot is raised when the machine is stopped by clockwise rotation of a shaft 136 journaled in the sewing machine frame. The arm 132 is moved by mechanism to be described, and the movement of this arm is imparted to the shaft 136 through connections including a bell crank 138 fixed to the rearward end of the shaft. A generally vertical link 140 is pivotally connected to the bell crank 138 at its upper end and at its lower end to the extremity of the arm 132 remote from the shaft 120. The connections for changing the timing of the thread locks include a rod 142 slidable in the machine frame which, in the position shown in Fig. 4, presses forwardly against a lever 144 to change the thread lock timing as the machine is being stopped. Connections to the shaft 136 for operating the presser foot and the arrangement of the thread locks are fully described and shown in the above-identified co-pending application to which reference may be had for a fuller understanding. The rod 142 is engaged at its rearward end by a cam surface on a forwardly extending arm of a lever 146 fulcrumed on a stud 148 fixedly supported in the driving frame. A rearwardly extending arm of the lever 146 is coupled to the arm 132 by a short vertical link the lower end of which loosely surrounds a pin on the lever and the upper end of which is pivotally connected to the arm 132. A spring 152 is stretched between an anchor on the driving mechanism frame and a pin extending from a collar 154 adjustably fixed on the rod 140. The spring 152 and the presser foot spring, which urges the presser foot into contact with the work while the machine is operating, are both effective in urging the rod 140 upwardly from the position shown in Fig. 4.

For imparting the necessary motion to the arm 132 before the rotation of the driven shaft is arrested, the stop roll 74 engages the periphery of a cam 156 upon which the buffer lever 72 is mounted (Fig. 2). The cam 156 which is fixed to the driven shaft has a contour which includes a lobe extending approximately 45° in advance of the buffer lever 72 for imparting to the roll 74 a motion away from the axis of the driven shaft. Movement of the roll 74 is transmitted through the lever 112 and the shaft 120 to the auxiliary arm 132, causing the latter to assume the position shown in Fig. 4 before the rotation of the driven shaft is stopped. The block 134 upon which the arm 132 is mounted is formed with a slot, the ends of which embrace the opposed edges of the offset member 126 so that the motion of the arm is also coupled to the outer sleeve 122 without imposing undue stress upon the rack portion of the outer sleeve.

As the buffer lever 72 approaches engagement with the stop roll 74 the arm 132 is latched in the position shown in Fig. 4 and the roll 74 is no longer urged into engagement with a periphery of the cam 156. As the arm 132 is approaching its latched position the lock-out latch 102 is released, thus permitting disengagement of the low-speed clutch a sufficient angular distance in advance of the engagement of the stopping members so that the engagement occurs with a minimum of shock.

While the low-speed clutch is engaged, the latch 102 is biased into engagement with the projection on the link 34 by a spring pressed plunger 158. Connections for releasing the latch 102 include a shaft 160 to one end of which the latch is pinned. The shaft 160 is rotatable in the frame and carries fixed. The shaft 160 is rotatable in the frame and carries fixed at its other end an arm 162 having an adjusting screw 164 threaded into an opening near the distal end of the arm. The screw which is locked in position by a check nut 166 engages a plate 168 fixedly secured to the plate 134 and the arm 132. The screw 164 is adjusted to cause release of the latch 102 before the arm 132 reaches the position shown in Fig. 4.

A latch is provided for maintaining the arm 132 in the position of Fig. 4 while the mechanism is stopped. The latch includes a lever 170 fulcrumed at the lower end of a bracket 172 pendantly supported on the frame as shown in Fig. 7. At its upper end the lever 170 is provided with an adjustable angle iron latching member 174 (see also Fig. 8). The member 174 is retained upon the lever 170 by screws 176 which pass loosely through a slot in the member and are threaded into the lever. The vertical adjustment of the member 174 determines the latched position of the arm 132 while the mechanism is at rest. The lever 170 is urged toward its latching position by a spring 178 stretched between a short arm of the lever extending below its fulcrum and a depending extension of the bracket 172. The movement of the arm 170 under the bias of the spring 178 is limited by an adjusting screw 180 threaded in the depending extension of the bracket and retained by a check nut 182. While the mechanism is in operation the member 174 is in contact with the forward edge of the plate 168. During the stopping of the mechanism the arm 132 is actuated, as already described, and as its outward end is depressed to a position slightly lower than that shown in Fig. 4, the edge of the plate 168 moves out of engagement with the member 174 thus allowing the arm 170 to be moved by the spring 178 to bring the member 174 into underlying or latching engagement with the plate 168.

Before the machine is started the member 174 is moved out of latching engagement with the plate 168 by a finger 184 (Figs. 6 to 8) bolted to the offset member 126. After release of the latch by the finger 184 and during subsequent operation of the driving and stopping mechanism, the member 174 is kept out of latching engagement with the plate 168 by contact of its rearward edge with that of the plate.

A fuller understanding of the driving and stopping mechanism will be obtained from the following brief description of a starting sequence beginning with the component parts initially in the positions shown in the drawings. When the control treadle is depressed the link 62 rises causing the cam segment 104 to engage the roll 106 (Fig. 2). As a result of this engagement the outer sleeve 122 slides forwardly on the shaft 120 and by engagement of its rack portion with the gear teeth of the lever 112 causes the roll 74 to move rearwardly out of the path of the buffer lever 72. After disengagement of the stopping members the lateral projection 66 of the three-arm lever 60 engages the underside of the latch-carrying arm of the lever 52 causing the latter to pivot in a counterclockwise direction as seen in Fig. 2. During the pivoting movement of the lever 52 the toggle links 34, 36 become alined sufficiently that the low-speed clutch is engaged. As the control treadle is further depressed the latch-bearing arm on the lever 52 is rotated further in a counterclockwise direction until the projection 70 of the latch 50 is out of engagement with the stop member 68 and the latch is moved by the spring 55 into engagement with the finger 58. Thereafter the relative positions of the toggle links and consequent force of engagement of either the high speed or low speed clutch is controlled by the treadle since the levers 50 and 52 are latched for movement together.

In bringing the mechanism to a stop the control treadle is released causing the link 62 to move downwardly and the lever 60 to be pivoted in a clockwise direction as seen in Fig. 2. Before the latch 50 is released by engagement of its projection 70 with the stop member 68, the pivotal movement of the lever 60 is temporarily arrested by engagement of the forward face of the arcuate block 92 with the pawl lever 76, which engagement also delays the engagement of the low-speed clutch. The projection 96 on the cam 88 by engaging the roll 86 effects the release of the levers 52 and 60 for limited movement together in a clockwise direction as shown in Fig. 2. During the limited movement of the levers the low-speed clutch becomes engaged and thereafter the latch 50 is released by contact of the projection 70 with the stop member 68, thus permitting the lever 60 to assume the position shown in Fig. 2. In this position of the lever 60, the cam segment 104 is out of engagement with the roll 106 and the sleeve 122 is moved rearwardly by the force of the spring 124. When the sleeve 122 reaches the rearward extreme of its movement the stop roll 74 engages the periphery of the cam 156 under the pressure of the spring 152 and of the pressure foot spring, as already described. During the period of low-speed clutch engagement the toggle links are maintained generally in alinement by the latch 102, shown in Fig. 4. As the shaft 14 continues to be driven by the low-speed clutch after engagement of the stop roll with the cam 156, movement toward the position shown in Fig. 4 is imparted to the arm 132 by the contour of the cam. As the arm 132 approaches the position shown in Fig. 4 the screw 164 is engaged by the plate 168 to cause release of the latch 102, which release is accompanied by disengagement of the low-speed clutch and followed by a coasting period preceding engagement of the stopping members. As the movement of the arm 132 causes the rod 140 to assume a position slightly below that shown in Fig. 4, the latching member 174 is swung under the plate 168 by the spring 178 and the arm 132 is thereafter latched in the position shown in Fig. 4. The buffer lever 72 then coasts into shockless engagement with the stop roll 74 for arresting the rotation of the shaft 14 in the desired angular position.

The buffer lever 72 is mounted on the cam 156 in such a way that no serious damage can result to the parts of the mechanism in the event of a malfunction allowing the stopping members to engage with greater than normal impact. For this purpose the buffer lever is pivoted on a stud 186 and yieldingly maintained in its stop roll engaging position by a compression spring 188 with an arm of the buffer lever in engagement with an integral lug of the cam 156. In the event of excessive shock upon engagement of the stopping members the spring 188, which is guided by a screw threaded in the lug, is compressed as the buffer lever pivots in a counterclockwise direction (Fig. 2) to escape the engagement with the roll 74. The only effect of this escape is an added revolution of the driven shaft since the spring 188 exerts sufficient force to prevent escape of the buffer lever at an impact force level which may be safely withstood by the stopping members.

Having thus described our invention, what we claim as new and desire to secure by Letters Patent of the United States is:

1. A driving and stopping mechanism for a heavily constructed shoe sole sewing machine requiring accurate control at either of two speeds at the option of an operator, said mechanism having a frame, driving members, a driven shaft, high- and low-speed clutches between the driving members and the driven shaft, a yoke for engaging either of the clutches for extended periods to rotate the driven shaft at either speed, a treadle for actuating the yoke, a pair of toggle links coupled at one end to the frame and at the other end to the yoke, and arranged to cause the low-speed clutch to be engaged when the links are moved to positions of substantial alinement and to cause the high-speed clutch to be engaged when the links are moved to positions of substantial misalinement, means connecting the treadle to the toggle links at their central joint, said means including one-way connecting means between the treadle and the central joint of the toggle links for moving the latter in one direction only to a position of substantial alinement in response to movement of the treadle in a corresponding direction, in combination with means for locking the one-way connection for conjoint movement of the treadle and the toggle in two directions while the driven shaft is being rotated by either the high or low-speed clutch and means for disconnecting the connection for movement of the treadle in one direction independently of the toggle.

2. A driving and stopping mechanism for a heavily constructed shoe sole sewing machine requiring accurate control at either of two speeds at the option of an operator, said mechanism having a frame, driving members, a driven shaft, high- and low-speed clutches between the driving members and the driven shaft, a yoke for engaging either of the clutches for extended periods to rotate the driven shaft at either speed, a treadle for actuating the yoke, a pair of toggle links connected at one end to the frame and at the other end to the yoke, and arranged to cause the low-speed clutch to be engaged when the toggle links are moved to positions of substantial alinement and to cause the high-speed clutch to be engaged when the toggle links are moved to positions of substantial misalinement, means connecting the treadle to the toggle links at their central joint, said means including arms of levers and a one-way connection between the arms, one of which levers is actuated by the treadle and the other of which actuates the central joint of the toggle links for moving the latter in one direction only to a position of substantial alinement in response to movement of the treadle in a corresponding direction, in combination with a latch operative in response to movement of the treadle throughout a portion of its range for locking the lever arms for conjoint movement to cause operation of the driven shaft by either the high or low-speed clutch according to the position of the treadle throughout said portion of the range, and means operative in response to movement of the treadle beyond said portion of its range for disconnecting the latch to permit movement of the treadle in one direction independently of said toggle.

3. A driving and stopping mechanism for controlling the speed of operation of a machine and for bringing the machine to rest with its parts in predetermined positions, said mechanism having a frame, driving member, a driven shaft, high- and low-speed clutches between the driving members and the driven shaft, a yoke for engaging the clutches to rotate the driven shaft, a treadle for actuating the yoke, a pair of toggle links connected at one end to the frame and at the other end to the yoke, and arranged to cause the low-speed clutch to be engaged when the toggle links are moved to positions of substantial alinement and to cause the high-speed clutch to be engaged when the toggle links are moved to positions of substantial alinement, means connecting the treadle to the toggle links at their central joint, said means including a one-way connection between the treadle and the central joint of the toggle links for moving the latter to a position of substantial alinement in response to movement of the treadle, in combination with means for locking the one-way connection for conjoint movement of the treadle and the toggle in two directions while the driven shaft is being rotated by either the high or low-speed clutch and for disconnecting the connection for movement of the treadle in one direction independently of the toggle, further movement of the treadle after disconnection of the connection imparting no additional corresponding movement to the toggle, and a lockout actuated by the driven shaft to hold up disconnection of the connection until a predetermined position of the driven shaft is reached.

4. A driving and stopping mechanism for controlling the speed of operation of a machine and for bringing the machine to rest with its parts in predetermined positions, said mechanism having a frame, driving members, a driven shaft, high- and low-speed clutches between the driving members and the driven shaft, a yoke for engaging the clutches to rotate the driven shaft, a treadle for actuating the yoke, a pair of toggle links coupled at one end to the frame and at the other end to the yoke, and arranged to cause the low-speed clutch to be engaged when the links are moved to positions of substantial alinement and to cause the high-speed clutch to be engaged when the links are moved to positions of substantial misalinement, means connecting the treadle to the toggle links at their central joint, said means including a one-way connection between the treadle and the central joint of the toggle links for moving the latter to a position of substantial alinement in response to movement of the treadle, in combination with a latch for locking the one-way connection for conjoint movement of the treadle and the toggle in two directions while the driven shaft is being rotated by either the high or low-speed clutch, and stationary means engageable by the latch for shifting the latch to its unlocked position when the treadle is released.

5. A driving and stopping mechanism for controlling the speed of operation of a machine and for bringing the machine to rest with its parts in predetermined positions, said mechanism having a frame, driving members, a driven shaft, high- and low-speed clutches between the driving members and the driven shaft, a yoke for engaging the clutches to rotate the driven shaft, a treadle for actuating the yoke, a pair of toggle links coupled at one end to the frame and at the other end to the yoke, said toggle links being operative to cause the low-speed clutch to be engaged when the links are moved to positions of substantial alinement and to cause the high-speed clutch to be engaged when the links are moved to positions of substantial misalinement, in combination with a disconnectible connection between the treadle and the central joint of the toggle links for moving the latter toward and from positions of alinement upon operation of the treadle while the driven shaft is being rotated by either the high or low-speed clutch, means for disconnecting the connection to permit movement of the treadle in one direction independently of the toggle, a lockout effective to hold up, until a predetermined position of the driven shaft has been reached, the movement of the toggle links toward a position of alinement and the disconnection of the connection, an auxiliary operations arm, means for actuating the auxiliary operations arm including a cam on the driven shaft and a stop roll, and a detent for maintaining the low-speed clutch in engagement until actuation of the arm is substantially completed.

6. A driving and stopping mechanism for controlling the speed of operation of a machine and for bringing the machine to rest with its parts in predetermined positions, said mechanism having a frame, driving members, a driven shaft, high- and low-speed clutches between the driving members and the driven shaft, a yoke for engaging the clutches to rotate the driven shaft, a treadle for actuating the yoke, a pair of toggle links coupled at one end to the frame and at the other end to the yoke, said toggle links being operative to cause the low-speed clutch to be engaged when the links are moved to positions of substantial alinement and to cause the high-speed clutch to be engaged when the links are moved to positions of substantial misalinement, in combination with a first lever connected to the treadle, a second lever connected to the central joint of the toggle, a releasable latch shiftable along an arcuate path and pivoted on one of said levers for coupling the levers together to move the toggle links toward and from alinement upon operation of the treadle, a fixed latch release member in the path of the latch to release the second lever for motion independently of the first lever after the toggle links are in substantial alinement, a lockout for retarding disengagement of the latch up to an angular position of the driven shaft in advance of its predetermined stopping position, and a second latch arranged for maintaining the low-speed clutch engaged after release of the lockout up to an angular position of the driven shaft sufficiently near its stopping position to enable the driven shaft to coast to its stopping position under its own momentum after release of the second latch.

7. A driving and stopping mechanism for a heavily constructed shoe sole sewing machine requiring accurate control at either of two speeds at the option of an operator, said mechanism having a frame, driving members, a driven shaft, high- and low-speed clutches between the driving members and the driven shaft, a yoke for engaging either of the clutches for extended periods to rotate the driven shaft at either speed, a treadle for actuating the yoke, a pair of toggle links coupled at one end to the frame and at the other end to the yoke, said toggle links being operative to cause the low-speed clutch to be engaged when the links are moved to positions of substantial alinement and to cause the high-speed clutch to be engaged when the links are moved to positions of substantial misalinement, in combination with the first lever connected to the treadle, a second lever connected to the central joint of the toggle, a releasable latch mounted on one of said levers for coupling the levers together while engaged to move the toggle links toward and from alinement upon operation of the treadle, a fixed latch release member to release the first lever for motion independent of the second lever after the toggle links have come into alinement, said release member being positioned and formed to arrest movement of the second lever in a stop position in which the toggle links cause both clutches to be disengaged, resilient means urging the second lever into the stop position after the latch is released, and one-way connecting means between the levers for imparting movement of the first lever to the second lever before the latch is re-engaged.

References Cited in the file of this patent

UNITED STATES PATENTS

| | | |
|---|---|---|
| 858,801 | Elliott | July 2, 1907 |
| 1,197,704 | Winkley | Sept. 12, 1916 |
| 1,242,247 | Schoenky | Oct. 9, 1917 |
| 1,697,999 | Oliver | Jan. 8, 1929 |